(12) United States Patent
Goldner et al.

(10) Patent No.: US 6,278,823 B1
(45) Date of Patent: Aug. 21, 2001

(54) SENSOR ARRAY CABLE AND FABRICATION METHOD

(75) Inventors: Eric Lee Goldner, Valencia, CA (US); Gary Thomas Griffin, Millicorn, TX (US); William David Briggs, Willow Creek, CA (US); Robert L. Kaplan, San Diego, CA (US); Dennis Patrick Bevan, Westlake Village, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/265,746

(22) Filed: Mar. 9, 1999

(51) Int. Cl.⁷ ...................................................... G02B 6/44
(52) U.S. Cl. .............................. 385/100; 385/12; 385/31; 385/136; 385/137; 385/138; 385/103; 385/113
(58) Field of Search .................................. 385/12, 13, 14, 385/15, 31, 48, 88, 89, 92, 100, 103, 113, 101, 147, 123, 136–138

(56) References Cited

U.S. PATENT DOCUMENTS

| | | | |
|---|---|---|---|
| 4,273,413 | | 6/1981 | Bendikson et al. ................. 385/88 X |
| 4,649,529 | * | 3/1987 | Avicola ................................... 385/12 |
| 4,717,232 | * | 1/1988 | Priaroggia ........................... 385/138 X |
| 4,761,053 | | 8/1988 | Cogelia et al. .................... 385/88 X |
| 4,767,168 | | 8/1988 | Grandy ................................. 385/88 X |
| 4,836,641 | * | 6/1989 | Priaroggia ......................... 395/100 X |
| 5,066,095 | * | 11/1991 | Dekeyser et al. ....................... 385/99 |
| 5,131,062 | * | 7/1992 | Eide et al. ............................. 385/12 |
| 5,335,620 | * | 8/1994 | Small .................................... 114/243 |
| 5,337,376 | * | 8/1994 | Ravetti et al. .......................... 385/12 |
| 5,680,489 | * | 10/1997 | Kersey ................................... 385/12 |
| 5,778,122 | * | 7/1998 | Giebel et al. ........................... 385/55 |
| 5,930,415 | | 7/1999 | Pham ..................................... 385/13 |
| 5,987,197 | * | 11/1999 | Kersey ................................... 385/24 |
| 5,997,186 | | 12/1999 | Huynh et al. .......................... 385/99 |
| 6,104,846 | * | 8/2000 | Hodgson et al. ....................... 385/12 |

\* cited by examiner

*Primary Examiner*—Brian Healy
(74) *Attorney, Agent, or Firm*—Bright & Lorig, P.C.; David M. Kleiman; Patrick F. Bright

(57) ABSTRACT

A sensor array cable and method of construction thereof utilizing a sensor/interlink assembly to facilitate the relatively easy and inexpensive installation of a sensor device in a cable that includes a strength member to provide tensile strength to the cable, optical fibers or wires for carrying electrical or optical energy to and from the sensor device, and a protective outer jacket. A portion of the protective outer jacket is removed allowing access to the inner strength member and optical fibers. A segment of the strength member is removed and an interlink/sensor assembly is installed in its place. The interlink serves to maintain the tensile strength of the cable. Optical fibers and/or electrical wires are connected to the sensor device for operation. The interlink/sensor assembly and associated optical fibers and electrical wires are then enclosed in an overmold which is sealed to the outer protective jacket.

96 Claims, 11 Drawing Sheets

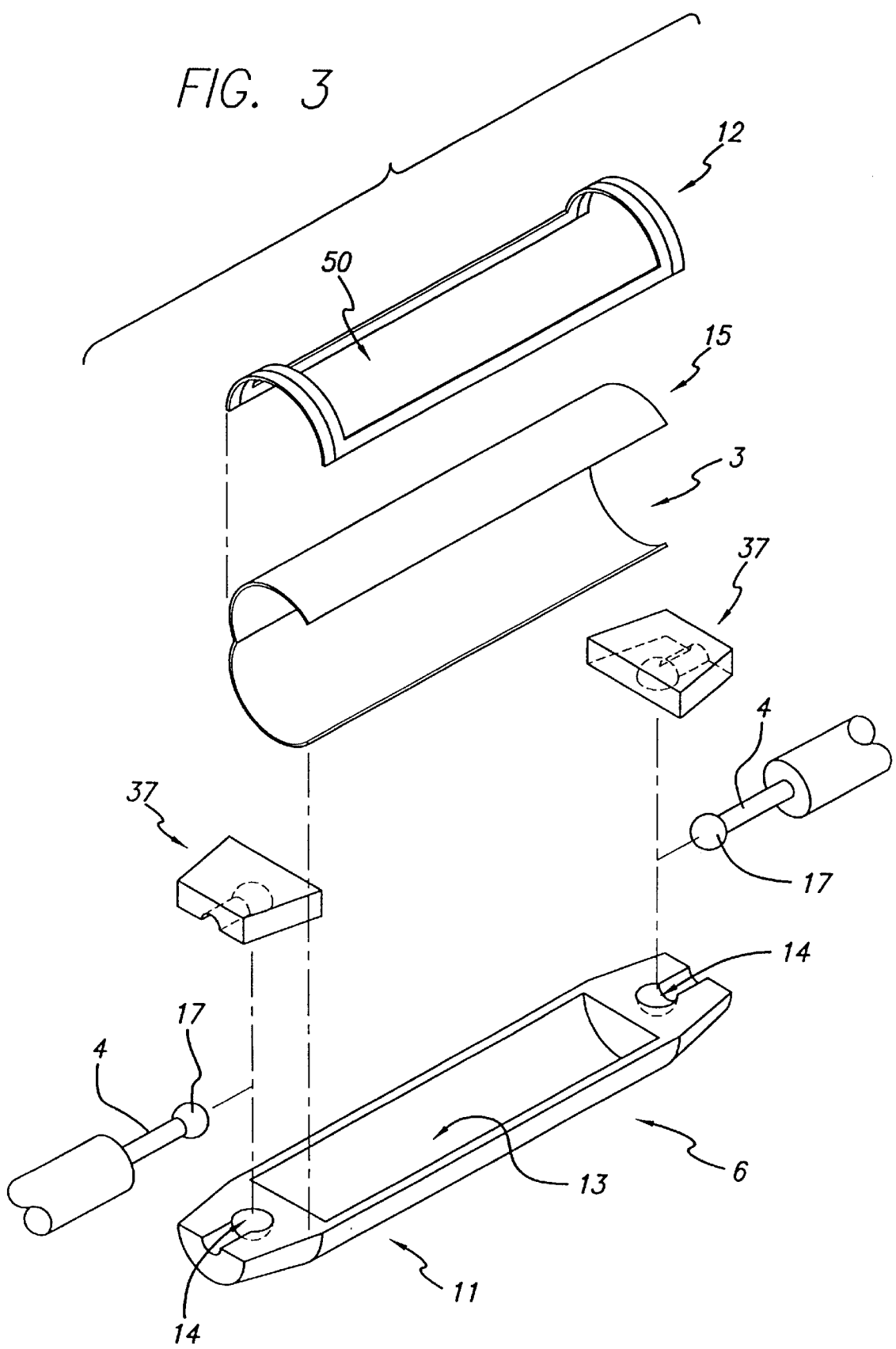

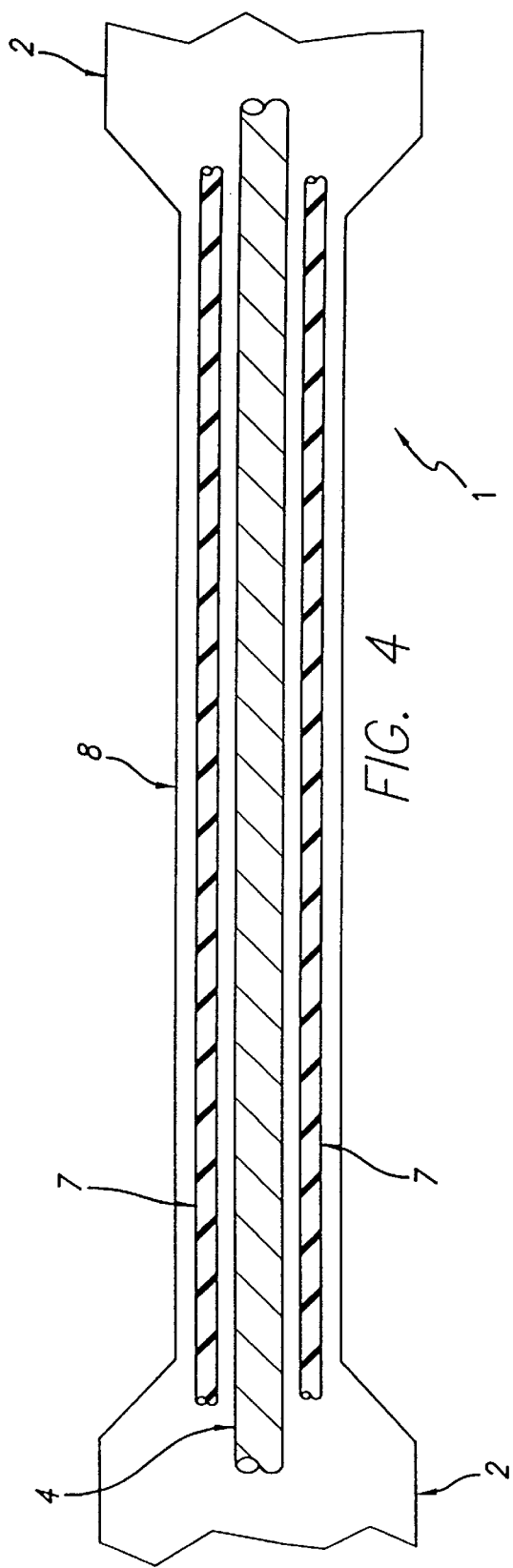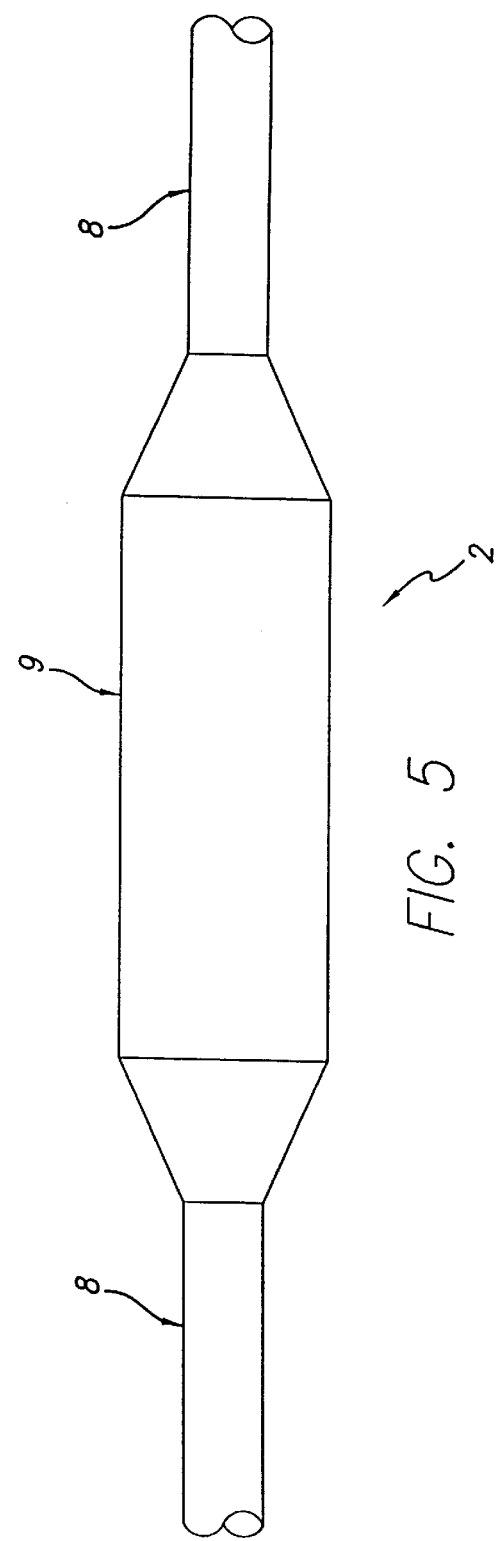

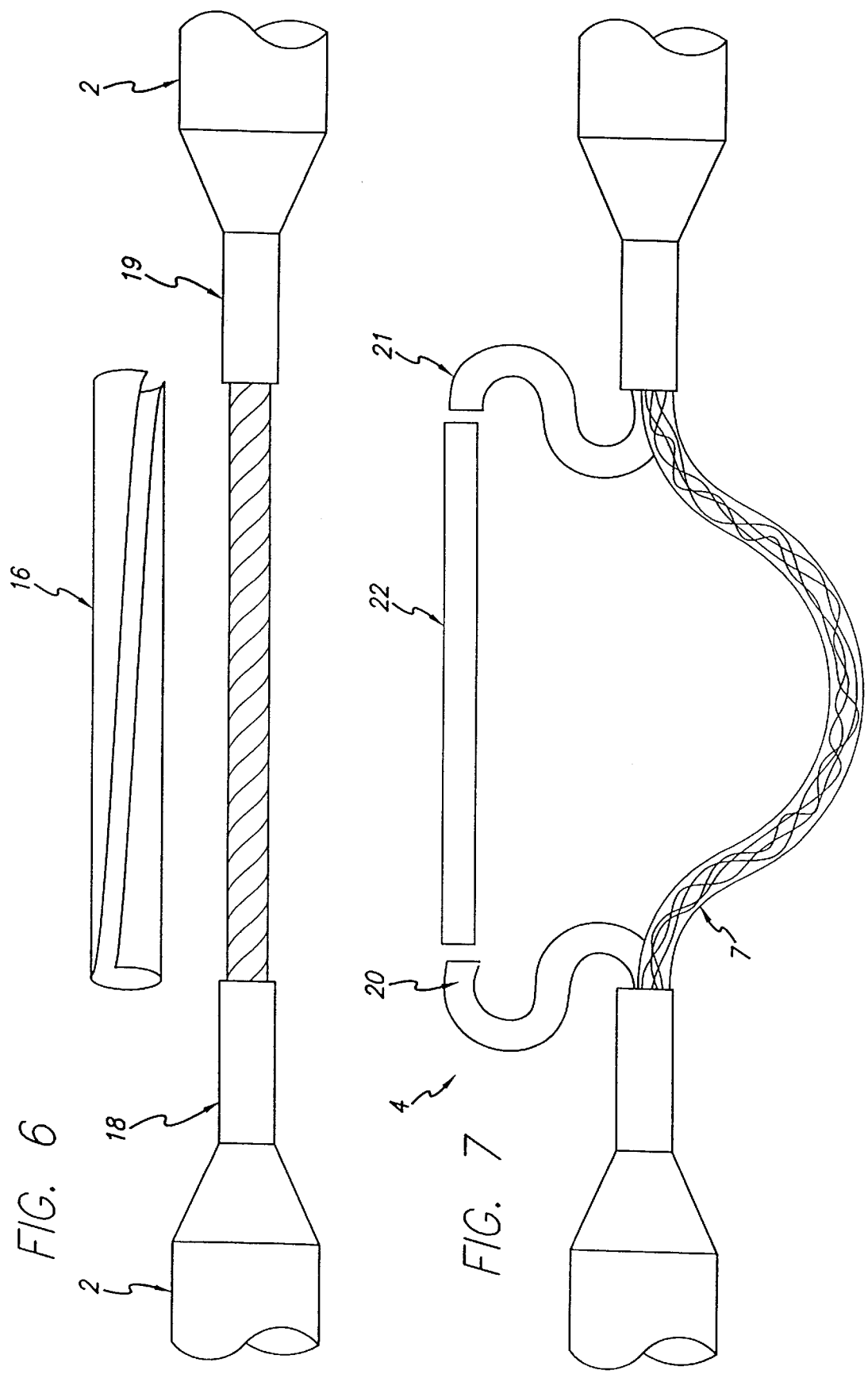

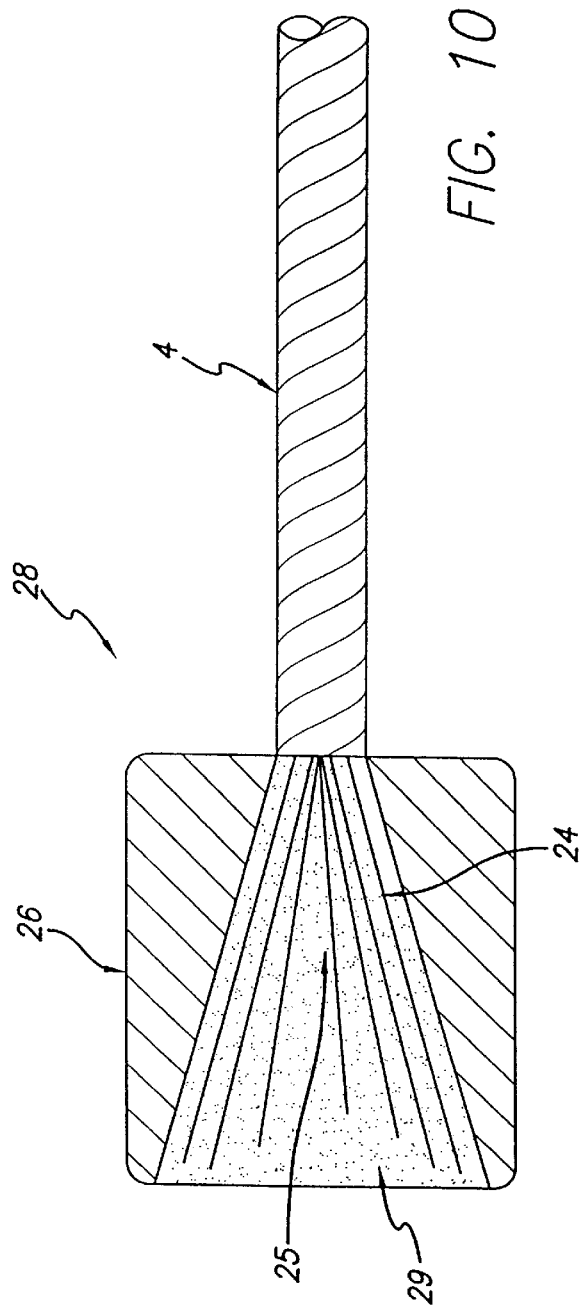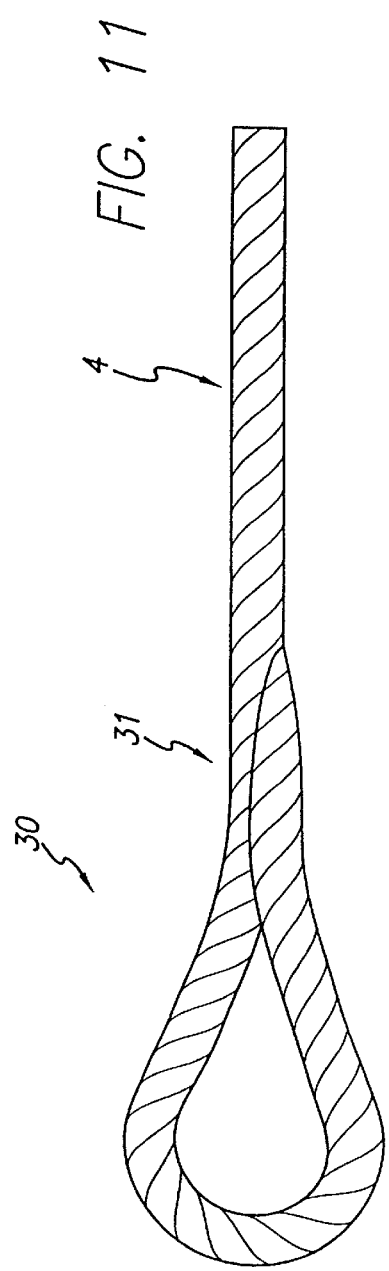

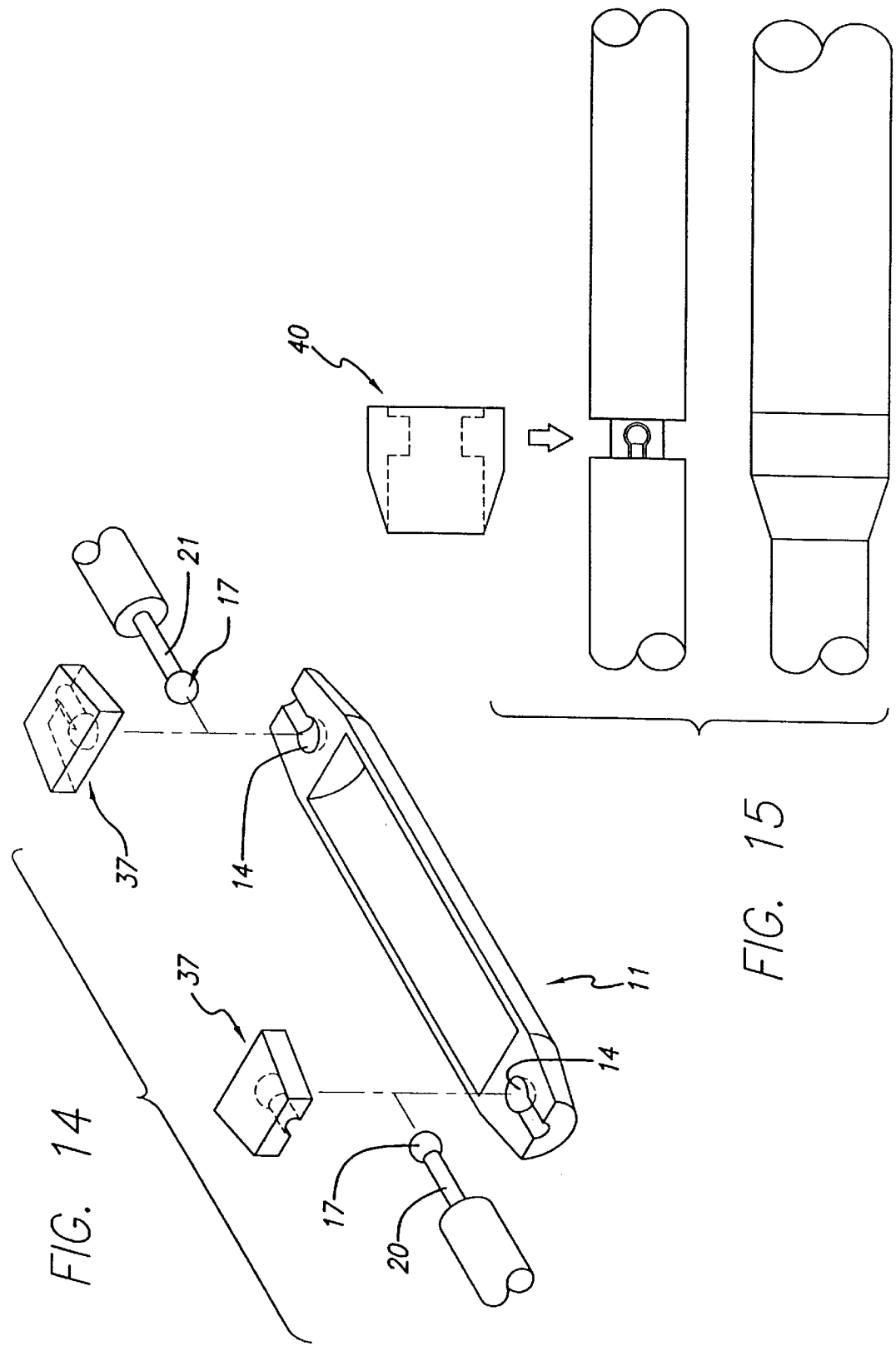

SENSOR ARRAY CABLE AND FABRICATION METHOD

BACKGROUND OF THE INVENTION

This invention relates to a sensor array cable and a method of making such cable.

The field to which the invention relates is that of cables including acoustic sensors of the kind most commonly used in marine seismic surveying.

BRIEF SUMMARY OF THE INVENTION

This invention provides a sensor array cable that incorporates a strength member, wires and/or optical fibers located around the strength member, a protective outer jacket, and one or more interlink/sensor assemblies. Such assemblies permit the easy and low cost installation of sensor devices in the cable. The methods of this invention include the steps of stripping off a portion of the protective outer jacket of such a cable, removing a portion of a strength member and inserting an interlink/sensor assembly in place of the removed portion. The cable is then overmolded with a plastic material. This method maintains the tensile strength, structural integrity and environmental ruggedness of the cable.

BRIEF DESCRIPTION OF THE DRAWINGS

FIG. 3. is a perspective view of components of an embodiment of an interlink/sensor assembly.

FIG. 4. is a side view in cross section of a portion of the cable of FIG. 1 between nodes FIG. 5. is a perspective view of a node on the cable of FIG. 1 showing the overmold.

FIG. 6. is a perspective view of an interior portion of the protective jacket segment being removed from between nodes of the cable of FIG. 1.

FIG. 7. is a perspective view of a portion of the strength member segment being removed from between nodes of the cable of FIG. 1.

FIG. 10. is a side elevation view in partial cross section of the strength member termination of the cable of FIG. 1 with a cast termination.

FIG. 11. is a side elevation view in partial cross section of the strength member termination of the cable of FIG. 1 with a braided splice termination.

FIG. 14. is a perspective view of the interlink being attached to the strength member segments of the cable of FIG. 1.

FIG. 15. is a side view in cross section of a clip being installed onto an interlink to capture a terminated strength member.

DETAILED DESCRIPTION OF THE INVENTION

Figure 1:
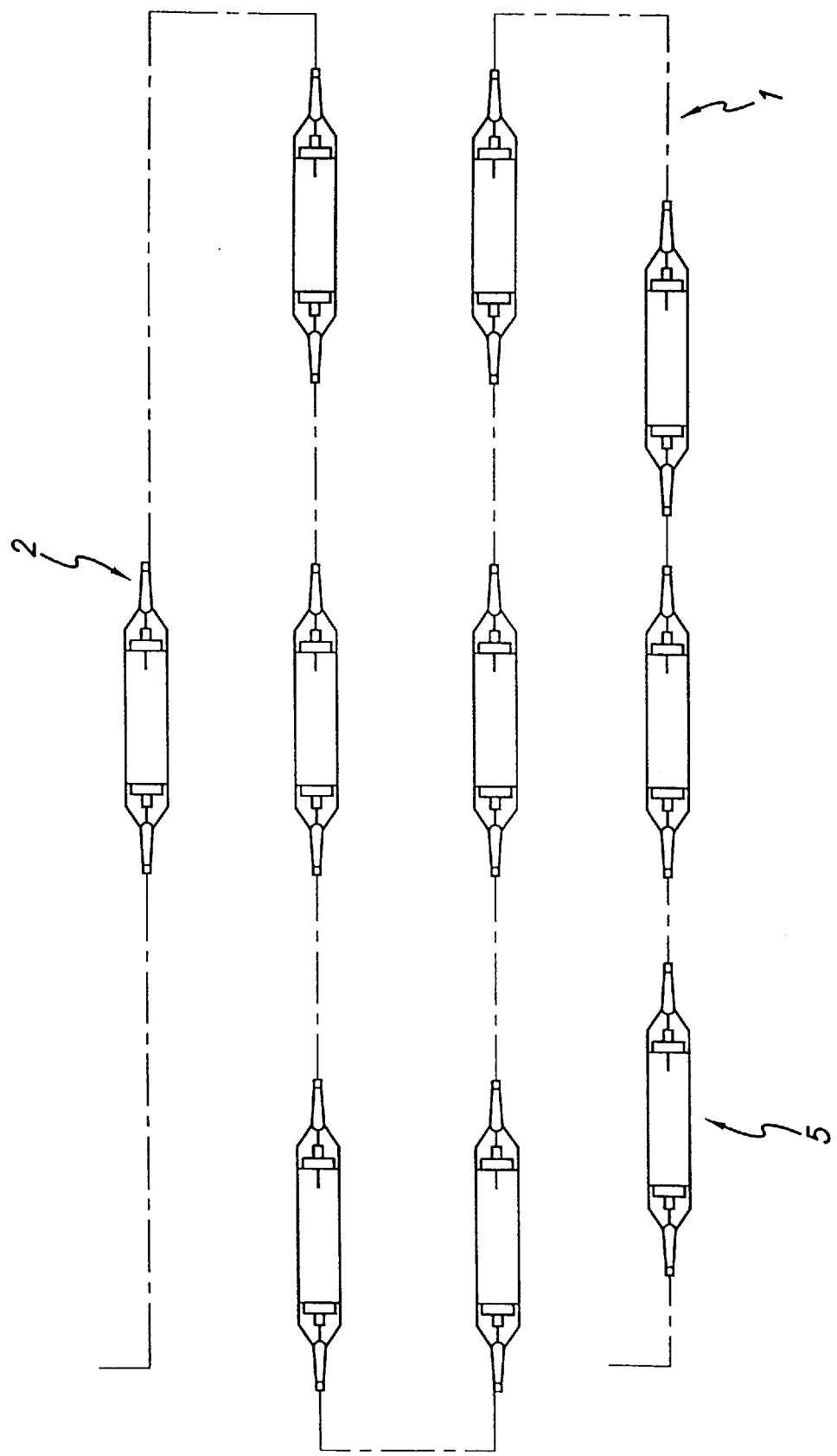
FIG. 1 is a top elevation view in cross section of a typical embodiment of a sensor array cable.

FIG. 1 shows a sensor array cable 1 that includes interlink/sensor assemblies 5 at various locations along its length, denoted nodes 2.

Figure 2:
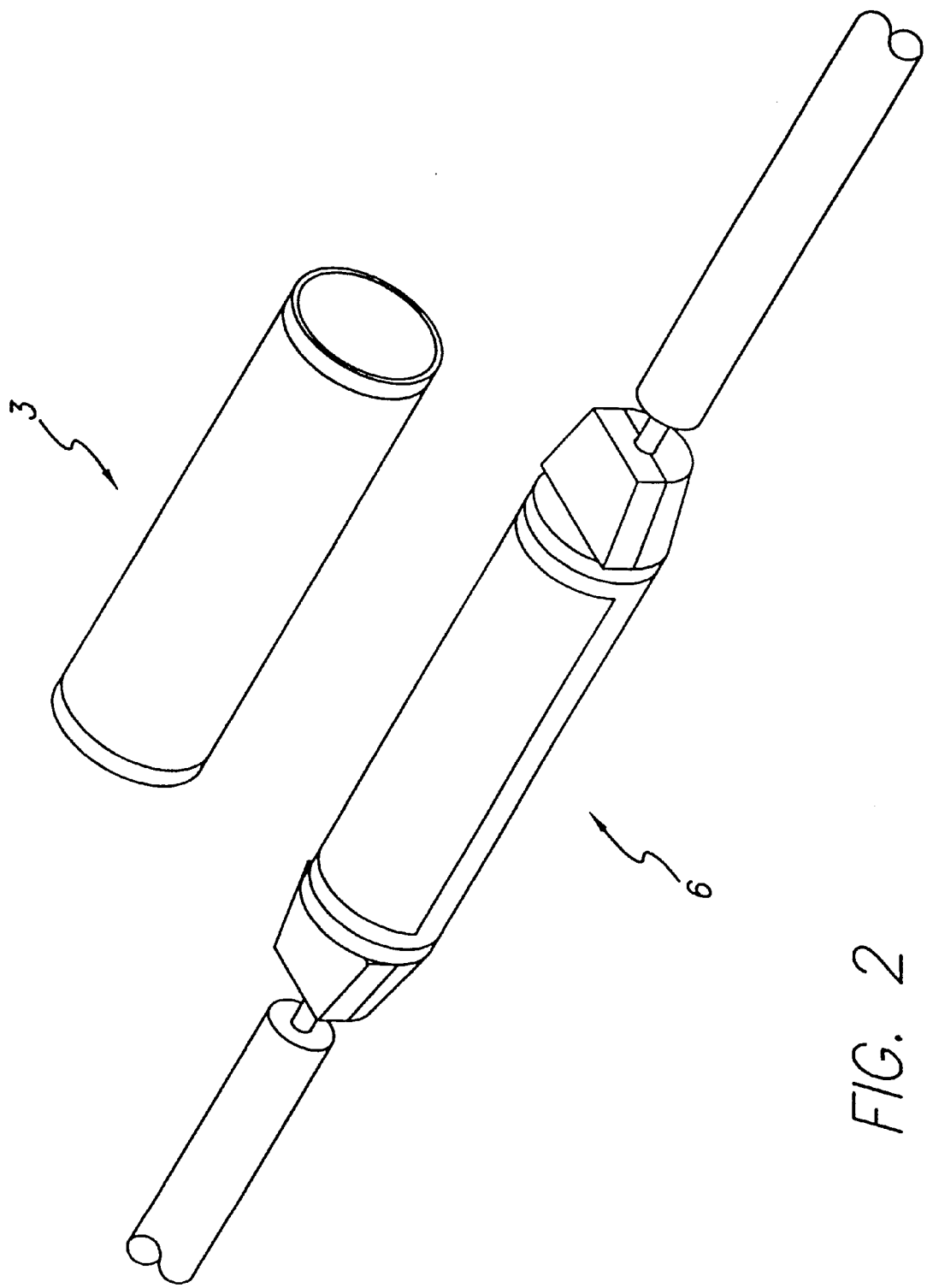
FIG. 2 is a perspective view in partial cross section of an interlink/sensor assembly.

FIG. 2 illustrates components of an embodiment of interlink/sensor assembly 5 in partial cross section which comprises interlink 6 and sensor device 3 which when combined form interlink/sensor assembly 5.

Figure 19:
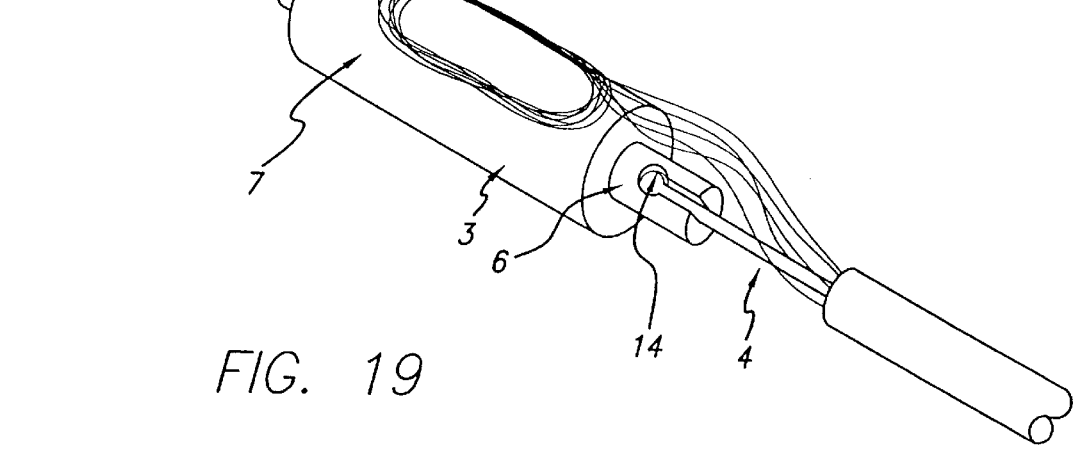
FIG. 19. is a perspective view of an installed interlink/sensor assembly where the interlink is internal to the sensor device.

Interlink 6 allows sensor device 3 to be quickly and inexpensively installed into cable 1 while still maintaining the tensile strength of cable 1. Interlink 6 is a structure preferably of appropriate shape and composition to evenly and continuously transmit mechanical stresses. Interlink 6 may be made of a plastic material such as engineering thermoplastic, or of a composite material such as glass reinforced epoxy, although this is not required and other suitable materials such as aluminum may be used as well, or a combination of materials may be used. In a preferred embodiment interlink 6 is internal to sensor device 3 as is illustrated in FIG. 19. FIGS. 2 and 3 shows an alternative embodiment where interlink 6 is an external structure that contains sensor device 3.

Sensor device 3 may include, as an example, any device that responds to a physical stimulus (for example heat, light, sound, pressure, magnetism or a particular motion) and transmits a resulting impulse (as for measurement or control). In one embodiment, for example, sensor device 3 is a hydrophone of the type commonly used in marine seismic surveying. Such hydrophones include but are not limited to those which operate using fiber optics or piezo-electric phenomena. Sensor device 3 may also include, as an example, any device for telemetry, signal conduction, signal processing, signal amplification, or the like. As such, sensor device 3 may contain, for example, optics and/or electronics for amplifying and/or transmitting output from a sensing device like a hydrophone. Sensor device 3, when used to amplify optical signals, may contain a plurality of one or more optical fiber couplers, optical fiber delay coils, optical fiber splices, wavelength division multiplexer couplers and optical fiber doped with such atoms as erbium or ytterbium. Electronics for amplifying and multiplexing electrical signals may also be included in sensor device 3. The precise function and configuration of sensor device 3 will vary with the application and does not affect the practice of the present invention.

FIG. 19 shows a preferred embodiment of interlink/sensor assembly 5 (as shown in FIG. 1) where interlink 6 is internal to sensor device 3. In such an embodiment interlink 6 may be a machined or cast solid object, such as a rod, containing slots 14 for receiving termini of strength member segments 4. Interlink 6 is then inserted into a cavity within sensor device 3 and bonded to sensor device 3. Strength member segments 4 are subsequently attached, through termini, to interlink 6 at slots 14 by way of bonding with rigid adhesive such as glass filled epoxy or by set screws.

FIG. 3 shows the components of another embodiment of interlink/sensor assembly 5 (as shown in FIG. 1) where sensor device 3 is contained within interlink 6. As illustrated, interlink 6 is a hollow body comprised of lower half 11 and upper half 12. Upper half 12 is shown as, for example, a frame with a window 50. Window 50 is an opening in upper half 12. Either, or both, lower half 11 or upper half 12 may, or may not, contain window 50 to facilitate visual inspection/handling access during assembly of interlink/sensor assembly 5 and flooding with encapsulant when used. Lower half 11, as shown, contains open cavity 13, and slots 14 for receiving termini 17 for attachment to cable strength member segments 4. Sensor device 3 is contained within hinged sleeve mount 15. The combined hinged sleeve mount 15 and sensor device 3 is placed into open cavity 13 of lower half 11. Hinged sleeve mount 15 protects enclosed sensor device 3 during handling. Upper half 12 is then placed over and attached to lower half 11, resulting in the combination of interlink 6 with sensor device 3 by encapsulating sensor device 3 within interlink 6 to form interlink/sensor assembly 5 (as shown in FIG. 1).

The embodiments shown in FIGS. 19 and 3 are not intended to be exclusive. Other embodiments may be appropriate depending upon the particular application, including but not limited to, embodiments where the interlink is an integral part of a sensor device, such as being internal to the sensor device or an external appendage.

FIG. 4 shows an embodiment of sensor array cable 1 of FIG. 1, between nodes 2, that facilitates the quick and inexpensive installation of interlink/sensor assembly 5. Between nodes 2 cable 1 is comprised of a strength member segment 4 that bears mechanical stresses placed upon cable 1, at least one transmission medium segment 7, and a protective jacket segment 8 which protects the interior components of the cable.

Strength member segments 4 may be cord or braid made of metal or a synthetic material such as Aramid fibers or Vectran. As is common in the art strength member segments may also have an outer coating jacket. Strength member segments 4 are joined together at the nodes 2 by attachment to interlink/sensor assemblies 5.

Figure 20:
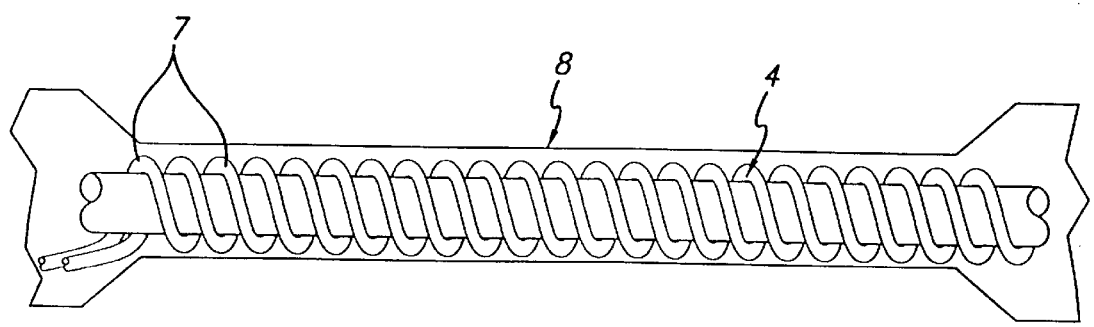
FIG. 20. is a side view of in cross section of a portion of the cable of FIG. 1 between nodes.

Transmission medium segments 7 may be electrical wires, optical fibers, or any other suitable energy wave guide or carrier which carries power and signals to and from sensor devices 3. Segments 7 lie in close proximity to strength member segments 4 and in a preferred embodiment are wound helically around strength member segment 4 as shown, for example, in FIG. 20. Transmission medium segments 7 are connected to sensor device 3 of interlink/sensor assembly 5 as necessary for its operation (receiving power, transmitting signals, etc.), or may pass through one or more nodes 2 without connection to a sensor device 3. In such a situation, transmission medium segment 7 may be dressed onto interlink/sensor assembly 5.

Protective jacket segments 8 may be made of any suitable material, but plastic material of sufficient elasticity, durability, strength and sealing ability such as polyethylene, polyurethane or nylon is preferred.

FIG. 5 illustrates how protective jacket segments 8 are connected together at nodes 2 through an overmold 9 which surrounds and contains interlink/sensor assembly 5.

Overmold 9 is made of a material such as plastic, rubber or other suitable elastomer which seals and protects interlink/sensor assembly 5 and segments 7 from the environment and forms a seal with segments 8 on either side of node 2.

Thus, the exterior of cable 1 includes protective jacket segments 8 joined together through overmolds 9, to form a continuous sealed protection from an exterior environment, such as water.

Interlink/sensor assemblies 5 are easy to add to cable 1. FIG. 6 shows the first step of installing an interlink/sensor assembly 5 into cable 1. A middle portion 16 of protective jacket segment 8 between nodes 2 is removed, through stripping or otherwise, to expose the interior of cable 1 (including strength member segment 4 and transmission medium segments 7). This leaves a first protective jacket segment 18 and a second protective jacket segment 19 alongside the newly exposed cable interior.

FIG. 7 shows the second step of installing an additional sensor device. Exposed transmission medium segments 7 are manipulated to provide easy access to a predetermined length of exposed strength member segment 4. If strength member segment 4 has an outer coating jacket then a portion of this outer coating jacket is removed by stripping or other means. An interior portion 22 of the strength member segment 4 is removed, which should be longer than interlink/sensor assembly 5 to be installed, leaving two exposed free ends 20 & 21, one on either end of the gap formed by removing interior portion 22.

Figure 8:
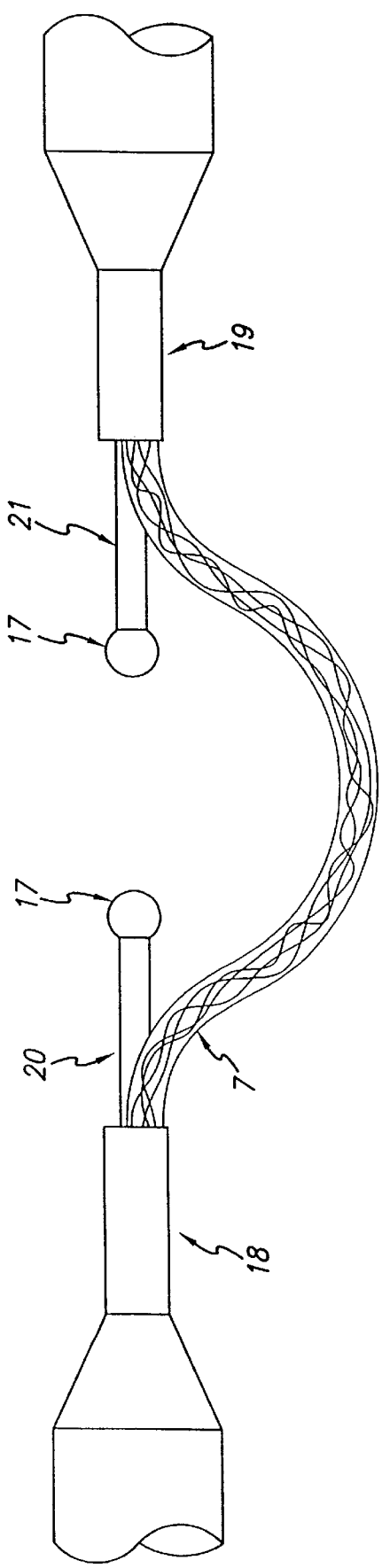
FIG. 8. is a perspective view of the free ends of the strength member segment with termini between nodes of the cable of FIG. 1.

FIG. 8 shows the third step of installing an additional sensor device. Each exposed free end 20 & 21 is given a terminus 17. The termini 17 prevent ends 20 & 21 from fraying, and allow for their attachment to interlink/sensor assembly 5 to transfer tensile loads from the strength member to interlink/sensor assembly 5. Different configurations of terminus 17 are feasible and will vary with the type of strength member segment 4 used and connection mode to interlink/sensor assembly 5. FIG. 8 shows an example of terminus 17 as ball swage (or right circular cylinder swage) where strength member segment 4 is steel cord or the like.

Figure 9:
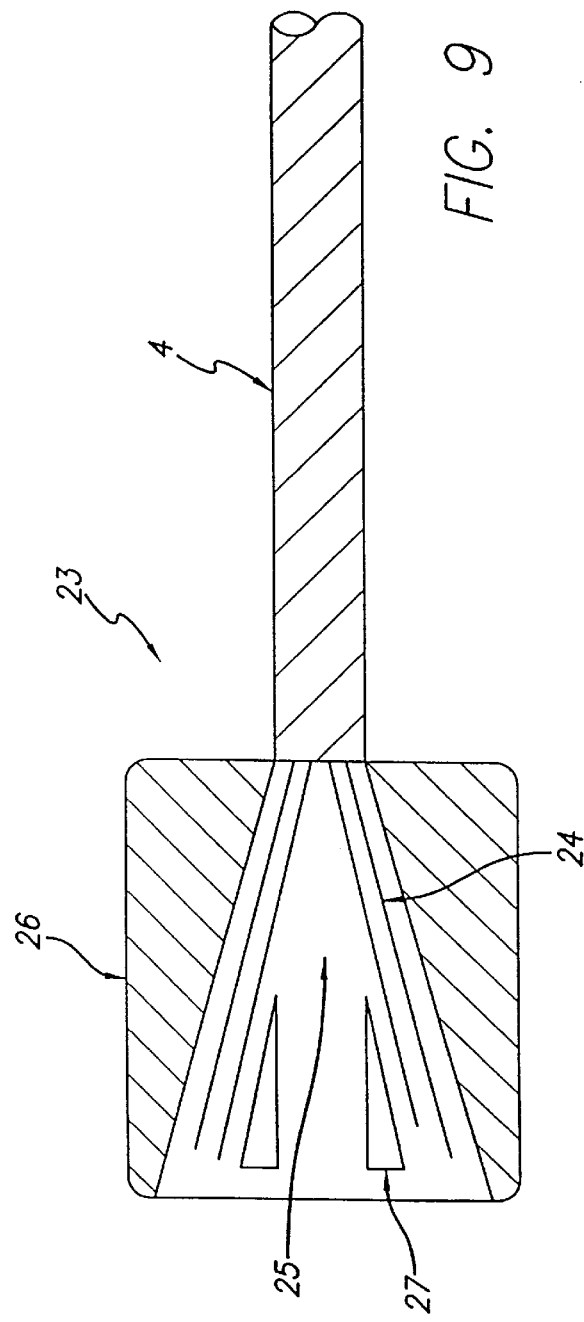
FIG. 9. is a side elevation view in partial cross section of the strength member termination of the cable of FIG. 1 with a wedge termination.

FIG. 9 shows wedge termination 23 which is another embodiment of terminus 17. Strands 24 making up non-metallic strength member segment 4 are inserted and spread throughout conical volume 25 within termination block 26. Metal wedges or cylinders 27 are driven into conical volume 25 between strands 24.

FIG. 10 shows a cast rope termination 28 which is another embodiment of terminus 17. Strands 24 of strength member segment 4, which may be either metallic or synthetic cord or braid, are inserted and spread throughout conical volume 25 within termination block 26. A hard casting material 29, such as a glass-filled epoxy, is placed within conical volume 25 and effectively bonds strength member segment 4 to termination block 26.

FIG. 11 shows a braided splice termination 30 which is another embodiment of terminus 17 when a braided synthetic cord, such as aramid, is used. A braided eye splice 31 is shown, the method and description of which is described in handbooks for sailing etc. such as *Chapman Piloting: Seamanship & Small Boat Handling* ($62^{nd}$ Ed.) Elbert S. Maloney, Charles Frederic Chapman (September 1996) Hearst Books Publishing ISBN 0688 148921.

Figure 12:
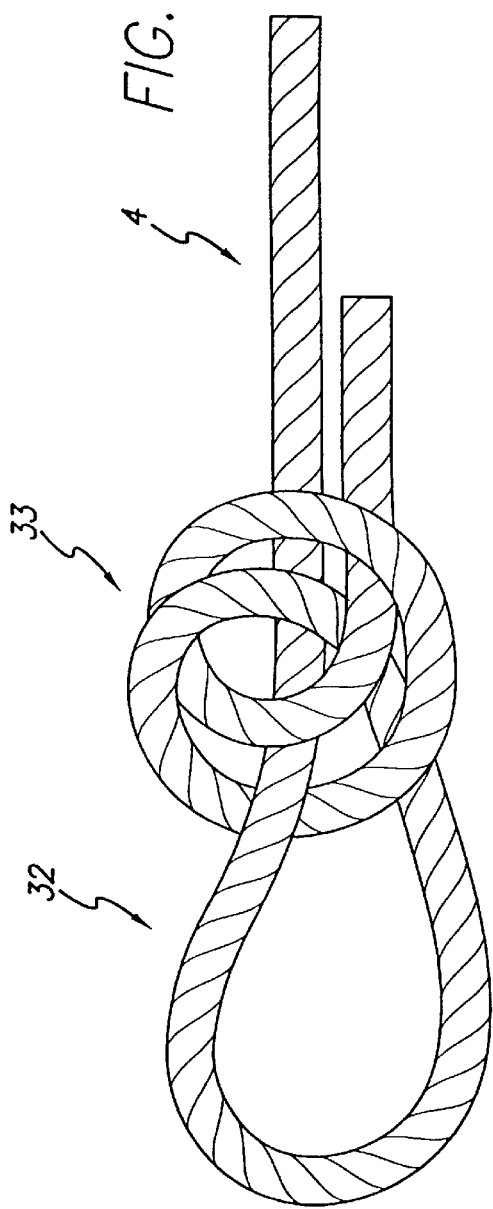
FIG. 12. is a side elevation view in partial cross section of the strength member termination of the cable of FIG. 1 with a knot termination.

FIG. 12 shows a knot termination 32 which is another embodiment of terminus 17 when a synthetic cord is used. Any suitable knot 33 may be used in forming the termination, the method and description of which is described in handbooks for sailing etc. such as *Chapman Piloting: Seamanship & Small Boat Handling* (62$^{nd}$ Ed.) Elbert S. Maloney, Charles Frederic Chapman (September 1996) Hearst Books Publishing ISBN 0688 148921.

Figure 13:
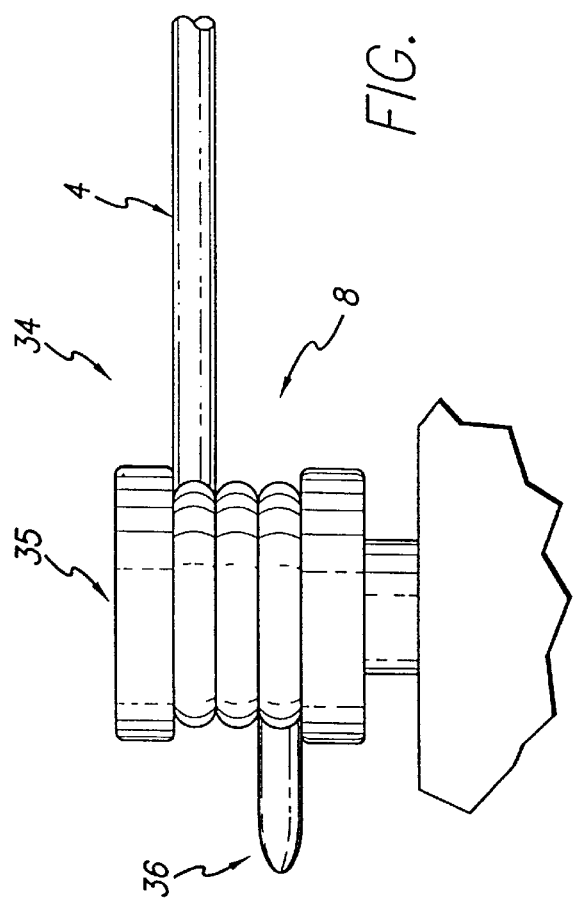
FIG. 13. is a side elevation view in partial cross section of the strength member termination of the cable of FIG. 1 with a capstan termination.

FIG. 13 shows a friction creating capstan termination 34 which is another embodiment of terminus 17. The free end of strength segment 8 is looped around capstan 35 preferably at least three times. Secure end 36 is then terminated by bonding end 36 to capstan 35, or interlink to which capstan 35 is attached, or other means to prevent unraveling of the loop around capstan 35. Other means of termination are also feasible and may be used as appropriate.

FIG. 14 shows the fourth step. Lower half 11 of interlink 6 with, as an example, slots 14 receives ends 20 & 21 which are terminated with, for example, a ball swage 17. Each end 20 & 21 is inserted into a slot 14. Termination link clamps 37 are then placed over slots 14 and attached to lower half 11 to hold terminated ends 20 & 21 in place. Other means of attachment are also feasible and suitable depending upon the type of terminus employed, if any, e.g. swaged fitting, bonded connection, threaded crimp fitting, compression fitting, etc.

Figure 16:
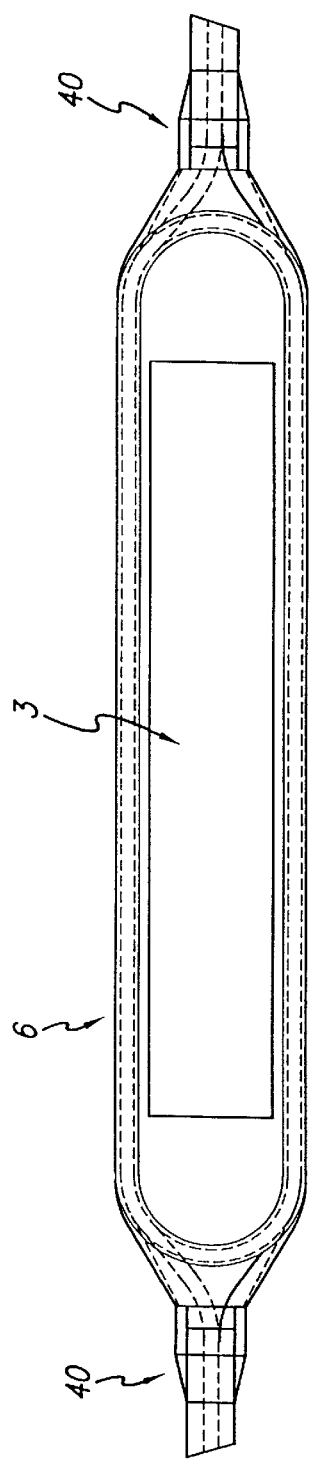
FIG. 16. is a top elevation view of installed clips next to an interlink/sensor assembly.

FIGS. 15 and 16 illustrates an embodiment where a clip 40 is installed onto interlink/sensor assembly 5 to capture terminus 17 in order to further assure a solid connection.

After attaching strength segment members 4 to interlink/sensor assembly 5, the fifth step is to cut (if not already done) and connect the necessary transmission medium segments 7 (e.g. wires or optical cables) to sensor device 3. For sensor devices 3 using optical components or fibers (such as a fiber optic hydrophone) optical fiber connectors such as FC/APC may be used, although the preferred method of optical fiber connection for such a sensor is fusion splicing. Other connection means will be appropriate depending upon the particular application. Any transmission medium segments 7 which are not connected to interlink/sensor assembly 5 may be dressed onto interlink/sensor assembly 5.

Figure 17:
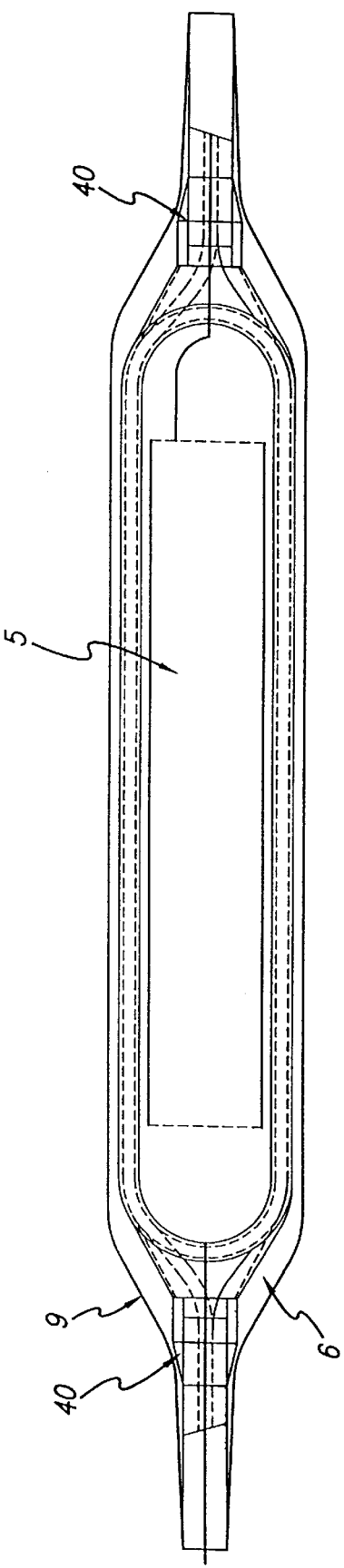
FIG. 17. is a top view in cross section of an installed interlink/sensor assembly encapsulated within an overmold.

FIG. 17 shows overmold 9, the result of the sixth and final step of installing a sensor into cable 1. After installing interlink/sensor assembly 5 as described above, the exposed cable interior with the interlink/sensor assembly 5 is then overmolded with a protective material such as plastic, rubber or another suitable elastomer, so that overmold 9 is formed and a watertight seal is made with protective jacket segments 8 on either side of the exposed cable interior. Overmold 9 may be formed by injection molding, casting or otherwise. It is also feasible, before forming the overmold to surround and contain said interlink/sensor assembly within a rigid tube. This provides the advantages of more flexibility in implementing molding/curing processes. Furthermore, if a rigid tube is employed which extends over the protective jacket segments it may simply be filled with an encapsulant and thus itself serve as an overmold.

Figure 18:
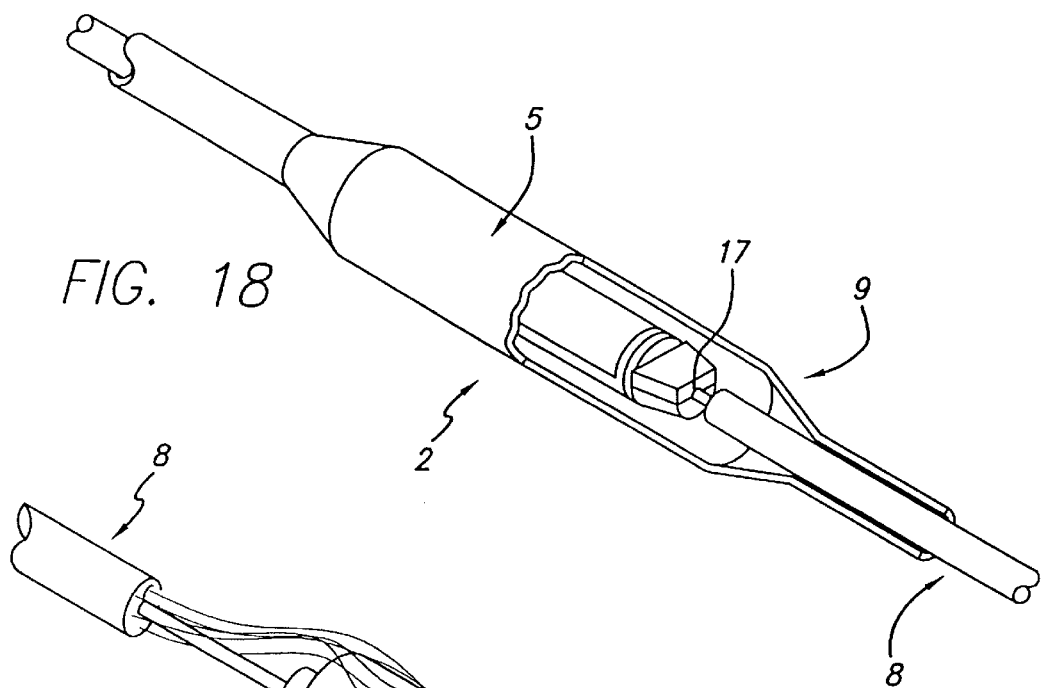
FIG. 18. is a perspective view of an installed interlink/sensor assembly and overmold in the cable of FIG. 1.

FIG. 18 shows a perspective view in cross section of a completed node 2 on cable 1 containing an interlink/sensor assembly 5 and overmold 9.

This method for installing a sensor device into a cable may be used to make an entire sensor array cable 1, starting with a cable containing a strength member 4, one or more transmission mediums 7, and a protective jacket 8, then adding the desired number of interlink/sensor assemblies 5. This method permits including any number of interlink/sensor assemblies to form sensor array cable 1.

Glossary of Terms

What follows is a glossary of terms to aid in the understanding of the disclosure and claims.

| Term | Definition |
|---|---|
| Node - | A location on a sensor array cable where a sensor device or an interlink/sensor assembly is located. |
| Cord - | A long slender flexible material which may consist of several strands woven or twisted together. |
| Fiber - | A slender and elongated natural or synthetic filament, which may be constructed of a material, such as glass or metal, which can convey (carry) electrical or light energy. |
| Braid - | A cord having at least two component strands forming a regular diagonal pattern down its length. |
| Strength member segment- | A cord made of a material, such as metal or Aramid fibers, that lies between nodes and provides tensile strength to a sensor array cable. |
| Interlink - | An object of a particular shape and composition adapted to transmit and bear mechanical stresses. |
| Sensor device- | A device that responds to a physical stimulus (for example heat, light, sound, pressure, magnetism or a particular motion) and transmits a resulting impulse (as for measurement or control), or a device for telemetry, signal conduction, signal processing, signal amplification, or the like. |
| Interlink/sensor assembly - | A combination of a sensor device and an interlink. |
| Transmission medium segment - | An object of a fixed length made of a material which can carry power and energy signals to and from a sensor device, and which may include, for example, electrical wires or optical fibers. |
| Protective jacket segment - | An object made of a material, such as plastic, rubber or other elastomer which protects a strength member segment, a transmission medium segment, or both, from the surrounding environment, such as water. |
| Overmold - | An object made of a material, such as plastic, rubber, or other elastomer which surrounds and contains an interlink/sensor assembly and transmission medium segments at a node, and forms a watertight seal with the protective jacket segments on either side of the node. |
| Terminus (plural: Termini) - | An end of a cord, fiber, or wire which has been shaped, or treated mechanically, chemically, or otherwise to prevent fraying and which allows attachment to a interlink and transmission of tensile loads. |
| Electrical wiring - | A conductor of electricity. |
| Optical fiber - | A fiber that conveys (carries) light energy. |
| Plastic - | An elastomer, rubber, or any of numerous organic synthetic or processed materials that are mostly thermoplastic or thermosetting polymers of high molecular weight and that can be molded, cast, extruded, drawn, or laminated into objects, films, or filaments. |
| Injection molding - | A method of creating plastic objects, films, or filaments. |
| Attachment point - | A location on an interlink/sensor assembly where a strength segment may be attached, such as a groove for accepting a terminus. |
| Dressed - | The placement of a transmission medium segment in and/or over and/or around an interlink/sensor assembly. |
| Connector - | A device that joins or links a transmission medium segment and a sensor device so that electrical or light energy can pass between them. |
| Telemetry module - | Any device used to receive an electrical or optical signal and to transmit the signal with, or without, amplification or modification. |
| Combine - | To bring two or more objects into close relationship, such as physical contact, without necessarily permanently or removably attaching the objects. |
| Occupy - | To fill, at least partially, a volume of space within a cavity. |
| Cavity - | An unfilled space within an object. |
| Open Cavity - | An unfilled space within an object that is contiguous with the space surrounding the object. |
| Closed Cavity - | An unfilled space within an object that is not in contact with the space surrounding the object. |
| Encapsulant - | A material used to encapsulate an object, such as an interlink/sensor assembly, which serves to protect the object encapsulated from mechanical |

-continued

| | |
|---|---|
| | stresses or loads or environmental conditions (such as water or air), and in some circumstances is used to facilitate or enhance performance of a device by, for example, matching the acoustic impedance of the surrounding environment. An encapsulant may be any suitable material including, but not limited to, polyurethane, polyethylene or other elastomer. |
| Encapsulate - | To completely enclose in. |
| Outer Coating Jacket - | An object made of a material, such as plastic, rubber or other elastomer which coats and protects a strength member segment. |

What is claimed is:

1. A sensor array cable comprising;
   at least two strength member segments connected together through an interlink/sensor assembly;
   said interlink/sensor assembly comprising an interlink and a sensor device;
   at least one transmission medium segment connected to said sensor device.

2. The sensor array cable of claim 1 further comprising a protective jacket segment surrounding said strength member segments and transmission medium segments on either side of said interlink/sensor assembly.

3. The sensor array cable of claim 2 further comprising an overmold surrounding said interlink/sensor assembly and sealed to said protective jacket segments on either side of said interlink/sensor assembly.

4. The sensor array cable of claim 1 further comprising a clip on either side of said interlink/sensor assembly.

5. The sensor array cable of claim 1 wherein said strength member segments are metallic cord.

6. The sensor array of claim 1 wherein said strength member segments are synthetic cord.

7. The sensor array of claim 1 wherein said strength member segments are glass reinforced plastic.

8. The sensor array of claim 1 wherein said strength member segments are glass/resin composite structures.

9. The sensor array cable of claim 1 wherein said strength member segments are synthetic braid.

10. The sensor array cable of claim 1 wherein said strength member segment has an outer coating jacket.

11. The sensor array cable of claim 1,2,3,4,5,6,7,8, 9 or 10 wherein said interlink/sensor assembly is connected to said strength member segment through a terminus.

12. The sensor array cable of claim 1,2,3,4,5,6,7,8, 9 or 10 wherein said interlink/sensor assembly is connected to said strength member segment through a terminus which is a swage fitting.

13. The sensor array cable of claim 1,2,3,4,5,6,7,8, 9 or 10 wherein said interlink/sensor assembly is connected to said strength member segment through a terminus which is a wedge termination.

14. The sensor array cable of claim 1,2,3,4,5,6,7,8, 9 or 10 wherein said interlink/sensor assembly is connected to said strength member segment through a terminus which is a cast termination.

15. The sensor array cable of claim 1,2,3,4,5,6,7,8, 9 or 10 wherein said interlink/sensor assembly is connected to said strength member segment through a terminus which is a braided splice termination.

16. The sensor array cable of claim 1,2,3,4,5,6,7,8, 9 or 10 wherein said interlink/sensor assembly is connected to said strength member segment through a terminus which is a knot termination.

17. The sensor array cable of claim 1 wherein said transmission medium segment is electrical wiring.

18. The sensor array cable of claim 1 wherein said transmission medium segment is optical fiber.

19. The sensor array of claim 1 further comprising at least two transmission medium segments at least one of which is electrical wiring and at least one of which is optical fiber.

20. The sensor array cable of claim 18 or 19 wherein said optical fiber transmission medium segment is connected to said sensor device by fusion splicing.

21. The sensor array cable of claim 18 or 19 wherein said optical fiber transmission medium segment is connected to said sensor device by optical fiber connectors.

22. The sensor array cable of claim 1 wherein said interlink is an object defining a cavity and said sensor device occupies said cavity.

23. The sensor array cable of claim 22 wherein said cavity is an open cavity.

24. The sensor array cable of claim 22 wherein said cavity is a closed cavity.

25. The sensor array cable of claim 22,23 or 24 wherein said sensor device is attached to a wall of said cavity.

26. The sensor array cable of claim 1 wherein said interlink comprises at least two objects connected together so as to define a cavity, wherein said sensor device occupies said cavity.

27. The sensor array cable of claim 26 wherein said sensor device is contained within a hinged sleeve mount.

28. The sensor array cable of claim 1, 26 or 27 wherein said strength member segments are attached to said interlink by a termination link clamp.

29. The sensor array cable of claim 1 wherein said sensor device contains a cavity and said interlink occupies said cavity.

30. The sensor array cable of claim 29 wherein said cavity is an open cavity.

31. The sensor array cable of claim 29 wherein said cavity is a closed cavity.

32. The sensor array cable of claim 29,30 or 31 wherein said interlink is attached to a wall of said cavity.

33. The sensor array cable of claim 2 wherein said protective jacket segments are comprised of a plastic material.

34. The sensor array cable of claim 2 wherein said protective jacket segments are comprised of an elastomer such as rubber.

35. The sensor array cable of claim 3 wherein said overmold is a plastic material.

36. The sensor array cable of claim 3 wherein said overmold is an elastomer such as rubber.

37. The sensor array cable of claim 1 wherein said sensor device is a hydrophone.

38. The sensor array cable of claim 1 wherein said sensor device is a fiber optic hydrophone.

39. The sensor array cable of claim 1 wherein said sensor device is a piezoelectric hydrophone.

40. The sensor array cable of claim 1 wherein said sensor device is a telemetry module.

41. The sensor array cable of claim 40 wherein said telemetry module receives and amplifies an optical signal.

42. The sensor array cable of claim 40 wherein said telemetry module receives and amplifies an electrical signal.

43. The sensor array cable of claim 40 wherein said telemetry module receives and amplifies an electrical signal and an optical signal.

44. The sensor array cable of claim 1 wherein said sensor device comprises at least one non-acoustic sensor.

45. The sensor array cable of claim 1 wherein said sensor device is a thermal sensor.

46. The sensor array cable of claim 1 wherein said sensor device is a pressure sensor.

47. The sensor array cable of claim 1 wherein said sensor device is a magnetic heading sensor.

48. A method for installing a sensor device in a cable with a protective jacket segment surrounding at least one strength member segment and at least one transmission medium segment, comprising the steps of;

removing a portion of said protective jacket segment to expose a length of said strength member segment, a length of said at least one transmission medium segment, leaving a first protective jacket segment and a second protective jacket segment on either side of where said interior portion was;

removing a segment of said exposed strength member length resulting in two exposed strength member ends on either side of the removed segment;

attaching said exposed strength member ends to an interlink;

combining a sensor device with said interlink to form an interlink/sensor assembly;

connecting said sensor device to at least one of said exposed transmission medium segments.

49. The method for installing a sensor device in a cable of claim 48 further comprising the step of surrounding and containing said interlink/sensor assembly within an overmold.

50. The method for installing a sensor device in a cable of claim 49 further comprising the step of sealing said overmold to said first and second protective jacket segments.

51. The method for installing a sensor device in a cable of claim 48, 49 or 50 wherein said strength member segment has an outer coating jacket, further comprising the step of removing a portion of said outer coating jacket.

52. The method for installing a sensor device in a cable of claim 48, 49, or 50 wherein said interlink contains a cavity and said combination step comprises placing said sensor device in said cavity.

53. The method for installing a sensor device of claim 52 wherein said sensor device is attached to said interlink.

54. The method of installing a sensor device in a cable of claim 48, 49, or 50 wherein said sensor device contains a cavity and said combination step comprises placing said interlink in said cavity.

55. The method of installing a sensor device in a cable of claim 54 wherein said interlink is attached to said sensor device.

56. The method of installing a sensor device in a cable of claim 48, 49, or 50 wherein said interlink comprises at least two objects connected together so as to define a cavity, wherein said sensor device occupies said cavity.

57. The method of installing a sensor device in a cable of claim 56 wherein said sensor device is contained within a hinged sleeve mount.

58. The method of installing a sensor device in a cable of claim 48 wherein said strength member segments are attached to said interlink at a termination link clamp.

59. A method for installing a sensor device in a cable with a protective jacket segment surrounding at least one strength member segment and at least one transmission medium segment, comprising the steps of;

removing a portion of said protective jacket segment to expose a length of said strength member segment, a length of said at least one transmission medium segment, leaving a first protective jacket segment and a second protective jacket segment on either side of the removed portion;

removing an interior segment of said exposed strength member length resulting in two exposed strength member ends on either side of where said interior segment was;

attaching said exposed strength member ends to an interlink/sensor assembly;

connecting said sensor device to at least one of said exposed transmission medium segments.

60. The method for installing a sensor device in a cable of claim 59 further comprising the step of surrounding and containing said interlink/sensor assembly within an overmold.

61. The method for installing a sensor device in a cable of claim 60 further comprising the step of sealing said overmold to said first and second protective jacket segments.

62. The method for installing a sensor device in a cable of claim 59, 60 or 61 wherein said strength member segment has an outer coating jacket, further comprising the step of removing a portion of said outer coating jacket.

63. The method for installing a sensor device in a cable of claim 48 or 59 further comprising the step of terminating each of said exposed strength member ends with a terminus.

64. The method for installing a sensor device in a cable of claim 48 or 59 wherein the strength member is metallic cord further comprising the step of terminating said free ends with a swage fitting.

65. The method for installing a sensor device in a cable of claim 48 or 59 wherein the strength member is metallic cord further comprising the step of terminating said free ends with a threaded crimp fitting.

66. The method for installing a sensor device in a cable of claim 48 or 59 wherein the strength member is metallic cord further comprising the step of terminating said free ends with a compression fitting.

67. The method for installing a sensor device in a cable of claim 48 or 59 wherein the strength member is a synthetic cord or braid further comprising the step of terminating said free ends with a cast rope termination.

68. The method for installing a sensor device in a cable of claim 48 or 59 wherein the strength member is a synthetic cord or braid further comprising the step of terminating said free ends with a braided splice.

69. The method for installing a sensor device in a cable of claim 48 or 59 wherein the strength member is a synthetic cord or braid further comprising the step of terminating said free ends with a knot termination.

70. The method for installing a sensor device in a cable of claim 48 or 59 wherein the strength member is a metallic or synthetic cord or braid further comprising the step of terminating said free ends with a capstan.

71. The method for installing a sensor device in a cable of claim 49 or 60 wherein at least one transmission medium segment not connected to said sensor device is placed onto the surface of said interlink/sensor assembly prior to surrounding and containing said interlink/sensor assembly within an overmold.

72. The method for installing a sensor device in a cable of claim 48 or 59 further comprising the steps of placing at least one transmission medium segment not connected to said sensor device onto a surface of said interlink/sensor assembly, surrounding and containing said interlink/sensor assembly within a rigid tube having a hollow interior, and filling said hollow interior with an encapsulant.

73. The method for installing a sensor device in a cable of claim 48 or 59 wherein said transmission medium segment is electrical wiring.

74. The method for installing a sensor device in a cable of claim 48 or 59 wherein said transmission medium segment is optical fiber.

75. The method for installing a sensor device in a cable of claim 74 wherein said optical fiber transmission medium segment is connected to said sensor device by fusion splicing.

76. The method for installing a sensor device in a cable of claim 74 wherein said optical fiber transmission medium segment is connected to said sensor device by optical fiber connectors.

77. The method for installing a sensor device in a cable of claim 48 or 59 wherein at least two transmission medium segments are provided at least one of which is electrical wiring and at least one of which is optical fiber.

78. The method for installing a sensor device in a cable of claim 77 wherein said optical fiber transmission medium segment is connected to said sensor device by fusion splicing.

79. The method for installing a sensor device in a cable of claim 77 wherein said optical fiber transmission medium segment is connected to said sensor device by optical fiber connectors.

80. The method for installing a sensor device in a cable of claim 48 or 59 wherein said protective jacket segments are comprised of a plastic material.

81. The method for installing a sensor device in a cable of claim 48 or 59 wherein said protective jacket segments are comprised of an elastomer such as rubber.

82. The method for installing a sensor device in a cable of claim 49 or 60 wherein said overmold is a plastic material.

83. The method for installing a sensor device in a cable of claim 49 or 60 wherein said overmold is an elastomer such as rubber.

84. The method for installing a sensor device in a cable of claim 48 or 59 wherein said sensor device is a hydrophone.

85. The method for installing a sensor device in a cable of claim 48 or 59 wherein said sensor device is a fiber optic hydrophone.

86. The method for installing a sensor device in a cable of claim 48 or 59 wherein said sensor device is a piezoelectric hydrophone.

87. The method for installing a sensor device in a cable of claim 48 or 59 wherein said sensor device is a telemetry module.

88. The method for installing a sensor device in a cable of claim 87 wherein said telemetry module receives and amplifies an optical signal.

89. The method for installing a sensor device in a cable of claim 87 wherein said telemetry module receives and amplifies an electrical signal.

90. The method for installing a sensor device in a cable of claim 87 wherein said telemetry module receives and amplifies an electrical signal and an optical signal.

91. The method for installing a sensor device in a cable of claim 48 or 59 wherein said sensor device comprises at least one non-acoustic sensor.

92. The method for installing a sensor device in a cable of claim 48 or 59 wherein said sensor device is a thermal sensor.

93. The method for installing a sensor device in a cable of claim 48 or 59 wherein said sensor device is a pressure sensor.

94. The method for installing a sensor device in a cable of claim 48 or 59 wherein said sensor device is a magnetic heading sensor.

95. The method for installing a sensor device in a cable of claim 48 or 59 comprising the further step of placing a clip on either side of said interlink/sensor assembly.

96. The method for installing a sensor device in a cable of claim 48 or 59 comprising the further step of repeating as needed the prior steps until the desired number of sensor devices has been installed.

* * * * *

UNITED STATES PATENT AND TRADEMARK OFFICE
CERTIFICATE OF CORRECTION

PATENT NO. : 6,278,823 B1
DATED : August 21, 2001
INVENTOR(S) : Eric Lee Goldner, Gary Thomas Griffin, William David Briggs, Robert L. Kaplan and Dennis Patrick Bevan It is certified that error appears in the above-identified patent and that said Letters Patent is hereby corrected as shown below:

Column 1,
Line 3, at the beginning of the specification, the following paragraph concerning government rights should appear:

> The U.S. Government has paid up license in this invention and the right in limited circumstances to require the patent owner to license others on reasonable terms as provided for by the terms of MANTECH N00014-95-2-0015

Column 7,
Line 19, the word "and" should appear after the semi-colon.

Column 9,
Line 21, the word "and" should appear after the semi-colon.

Column 10,
Line 6, the word "and" should appear after the semi-colon.

Signed and Sealed this

Thirtieth Day of April, 2002

*Attest:*

JAMES E. ROGAN
*Director of the United States Patent and Trademark Office*

*Attesting Officer*